United States Patent
Kronman

(10) Patent No.: US 11,208,604 B2
(45) Date of Patent: Dec. 28, 2021

(54) CHIPPED CHARCOAL FUEL AND METHOD OF PRODUCTION THEREOF

(71) Applicant: Leonard Kronman, Tucson, AZ (US)

(72) Inventor: Leonard Kronman, Tucson, AZ (US)

(73) Assignee: Leonard Kronman, Tuscon, AZ (US)

( * ) Notice: Subject to any disclaimer, the term of this patent is extended or adjusted under 35 U.S.C. 154(b) by 6 days.

(21) Appl. No.: 16/399,032

(22) Filed: Apr. 30, 2019

(65) Prior Publication Data
US 2020/0347312 A1    Nov. 5, 2020

(51) Int. Cl.
*C10L 5/28*    (2006.01)
*C10L 5/36*    (2006.01)

(52) U.S. Cl.
CPC .............. *C10L 5/28* (2013.01); *C10L 5/361* (2013.01); *C10L 2290/02* (2013.01); *C10L 2290/546* (2013.01)

(58) Field of Classification Search
CPC . Y02E 50/10; C10L 5/36; C10L 5/361; C10L 5/363; C10L 5/366; C10L 5/28; C10L 2290/02; C10L 2290/546
See application file for complete search history.

(56) References Cited

U.S. PATENT DOCUMENTS

| | | | | |
|---|---|---|---|---|
| 3,929,585 A | * | 12/1975 | Grimmett | ............... C10B 53/02 201/2.5 |
| 2016/0362607 A1 | * | 12/2016 | Weaver | ................. C01B 32/205 |

FOREIGN PATENT DOCUMENTS

JP    2009114296 A    *    5/2009

OTHER PUBLICATIONS

Machine Translation of JP2009114296A (Year: 2009).*

* cited by examiner

*Primary Examiner* — Ellen M McAvoy
*Assistant Examiner* — Ming Cheung Po

(57) ABSTRACT

Described herein is a method for isolating high carbon chipped wood charcoal fuel suitable for grilling food. According to one aspect, the method involves removing pyrolyzed wood charcoal from a kiln wherein the pyrolyzed wood charcoal comprises lumps, chips, smaller pieces, and dust particles. The pyrolyzed wood charcoal is passed over a first sieve that is configured to separate the lumps from the chips, smaller pieces and dust particles. The chips, smaller pieces and dust particles are then passed over a second sieve that is configured to separate the chips from the smaller pieces and dust particles. The resulting chipped wood charcoal is consistently sized to be small enough to pass through a food supporting grill grate and supportable by an underlying grid support, thereby allowing refueling while grilling without interruption.

7 Claims, 3 Drawing Sheets

CHIPPED CHARCOAL FUEL AND METHOD OF PRODUCTION THEREOF

BACKGROUND

Grilling enthusiasts have long considered solid wood charcoal as an ideal fuel for optimum flavor, moisture retention, and texture when grilling meats and vegetables. Unlike natural gas or propane, which generates a lot of moisture as a result of the combustion thereof, solid wood charcoal generates a very hot, dry heat that is ideal for searing meat and vegetables and consequent moisture retention while cooking. Charcoal briquettes, which are often made by compressing coal dust, sawdust, charcoal dust with binding agents, are preferred by many for generating a steady heat over a long period of time, but can impart unpleasant chemical flavors and odors to food. Solid natural wood charcoal, though, generates higher heat than briquettes, for searing and faster cooking, and imparts neutral or wood smoke flavor to foods that many people prefer.

Solid wood charcoal is created by a process known as pyrolysis: the heating wood pieces to a high temperature in a low oxygen environment. This ancient process removes water and many volatile compounds and changes the chemical structure of the wood. Natural wood charcoal can be one-fourth the weight of the wood it is made from, and is naturally very brittle. Because it is so brittle, when natural wood charcoal is handled when removing from the kiln, and during processing or packaging, small pieces of wood charcoal chip away from exterior surfaces of the larger pieces. Because the outer-most portions near the surface of the wood charcoal are more directly exposed to the minimal flow of air through the kiln, they provide easier egress for volatiles from the wood than interior portions. These outer-most portions are therefore higher in concentration in fixed-carbon as a percentage of mass than the wood charcoal pieces as a whole, and are consequently also more fragile and more likely to chip away from the solid charcoal lumps. These small pieces would fall through traditional charcoal support structures; they are generally considered by those in the field to be unusable in this form as a grilling fuel source because they would fall through the fuel support structure in the grilling apparatus. Because it was considered to be unusable, this "chipped wood charcoal" is regarded by companies involved in producing natural wood charcoal as an undesirable byproduct of production and is therefore sold, along with smaller particles and dust, at very low cost to manufacturers of charcoal briquettes or activated carbon filters.

SUMMARY

Described herein are methods and apparatuses for grilling food using chipped wood charcoal, a novel and superior fuel for grilling. The chipped wood charcoal fuel is gathered from chipped pieces of wood charcoal formed by pyrolysis of natural wood. The chipped wood charcoal pieces have a high concentration of fixed carbon and may range in size from about one-fourth to about three-eighths of an inch in its longest dimension. Production of such fuel involves a novel multi-step process for separating the desirable small pieces of high carbon chipped wood charcoal from larger lumps of wood charcoal and still smaller pieces and dust that would fall through the support structure described herein. The support structure for the chipped wood charcoal that is described herein may be disposed for use with existing grilling apparatuses. Finally, a method of cooking food is described herein, which includes a novel method of adding chipped charcoal to the fuel support structure, through a grill grate used for supporting food, before and during cooking.

DETAILED DESCRIPTION

Modern chefs and home cooks often prefer to grill meat and vegetables over natural solid wood charcoal. The inventor of the apparatus and techniques described herein successfully developed and commercialized an apparatus, previously disclosed in U.S. Pat. No. 6,161,534, which is fully incorporated herein by reference, designed for converting a natural gas or propane grill to cook with natural solid wood charcoal. The inventor, who has also successfully developed multiple brands of natural solid wood charcoal for grilling, recognized that chipped wood charcoal, previously understood to be an "unusable" byproduct of wood charcoal production, is not only usable, but is in many ways a superior fuel source for food grilling. These superior properties include, among other things, faster lighting, hotter burning, and, due to an extremely high concentration of fixed carbon, more pure combustion. However, several problems existed that heretofore had not been recognized or addressed. First, pieces of wood charcoal of appropriate size must be determined and isolated such that fuel may be added through a food grate, while still being supportable below the food grate. Second, a grid must be designed for supporting the small pieces of chipped wood charcoal while enabling sufficient airflow for optimum combustion. Finally, a method for cooking over chipped wood charcoal, uniquely enabling prolonged cooking by refueling without lifting the food grill grate or interrupting the cooking process, by passing the fuel directly through ordinary, traditional, food supporting grill grates.

Figure 1:
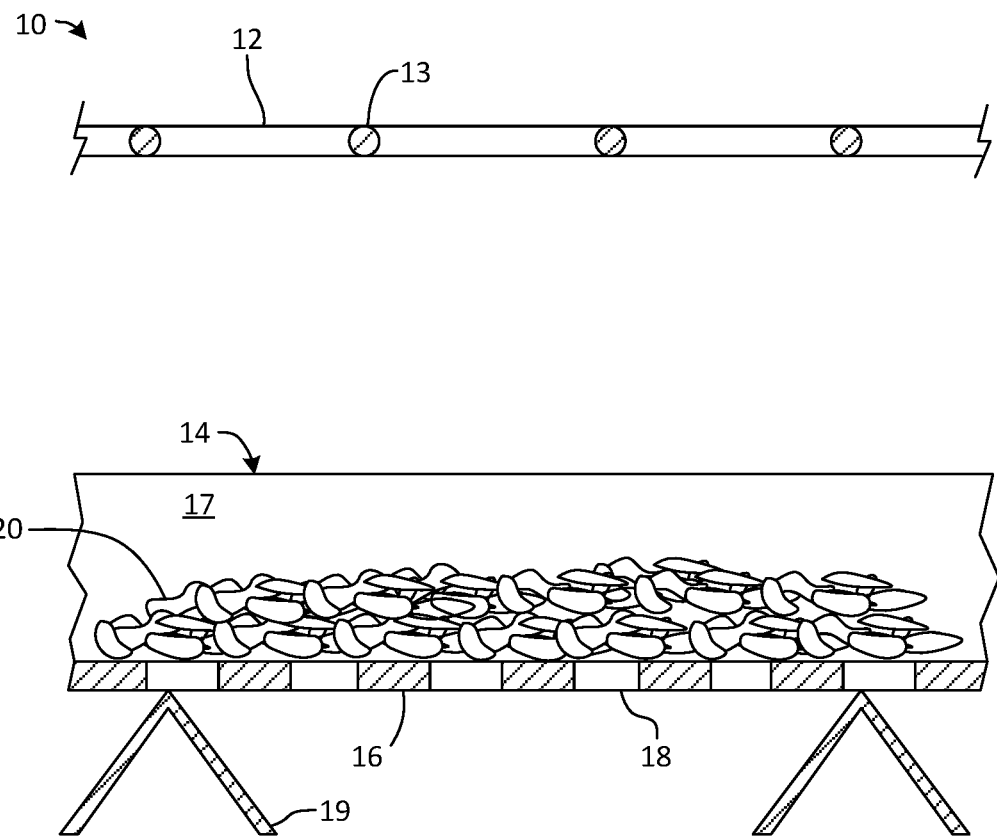
FIG. 1 illustrates a cross-section of segment of a food grilling apparatus including a chipped charcoal support.

FIG. 1 shows a segment of food grilling apparatus 10 in cross-section. It should be noted that this diagram is not to scale. Apparatus 10 includes an ordinary food support grill grate 12 having consistently spaced bars for supporting food such as meats and/or vegetables. A grid 14 includes bottom perforated portion 16 with perforations 18 and an upstanding side edge 17. Chipped wood charcoal 20 is shown supported by bottom perforated portion 16. Supports 19, which may be an existing briquette support grate or heat spreaders of a gas grill, support grid 14. As described, therefore, grid 14 may be added to any traditional standard solid fuel or gas burning grilling apparatus, for supporting chipped wood charcoal as an alternative fuel source.

Grid 14, as viewed from above, may be square, rectangular, or other shape, formed from perforated metal. In one embodiment, grid 14 is formed from 14 to 20-gauge steel or aluminum with three-eights inch round or five-sixteenths inch square perforations that make up 39% to 44% of the surface area of the perforated portions of the sheet. It has been discovered by the present inventor that these characteristics allow a balance of airflow for maximum heat generation with minimal fall-through of the chipped wood charcoal fuel, while also maintaining structural integrity of grid 14 under the very high temperature extremes generated while grilling. Edges 17 may rise from all sides of grid 14 a distance of one-half inch. Edges 17 may vary in construction. In exemplary embodiments, edges 17 may be formed from the same sheet of metal as bottom perforated portion 16, and simply bent up and welded at the corners. In this case, edges 17 may be perforated or not perforated. In other embodiments, edges 17 may be a spot-welded half-inch metal round or square bar, or bent-metal sheet, which may vary with consumer verses commercial chef requirements. Edges 17 provide structural integrity to grid 14 as it experiences extreme heat changes and gradients. Although shown extending up from bottom perforated portion 16, grid 14 may be oriented extending down if it is desired to lift fuel supporting bottom perforated portion up from supports 19.

Chipped wood charcoal fuel 20, in various embodiments, is created from 100% natural virgin hardwoods which have been aged for 12-18 months prior to pyrolysis processing in kilns. Because kiln firing techniques and because only hardwoods are used, the chipped wood charcoal fuel has a higher (ultra) fixed carbon component and fewer volatiles than typical wood charcoal found in stores and restaurant supply houses. Substantially all, but at least a majority of the pieces of chipped wood charcoal fuel 20 is sized between one quarter to three-eighths of an inch. This enables it to easily drop through grill grate 12 and onto the grid 14, eliminating any need to stop and lift grill grate 12 to refuel.

Figure 2:
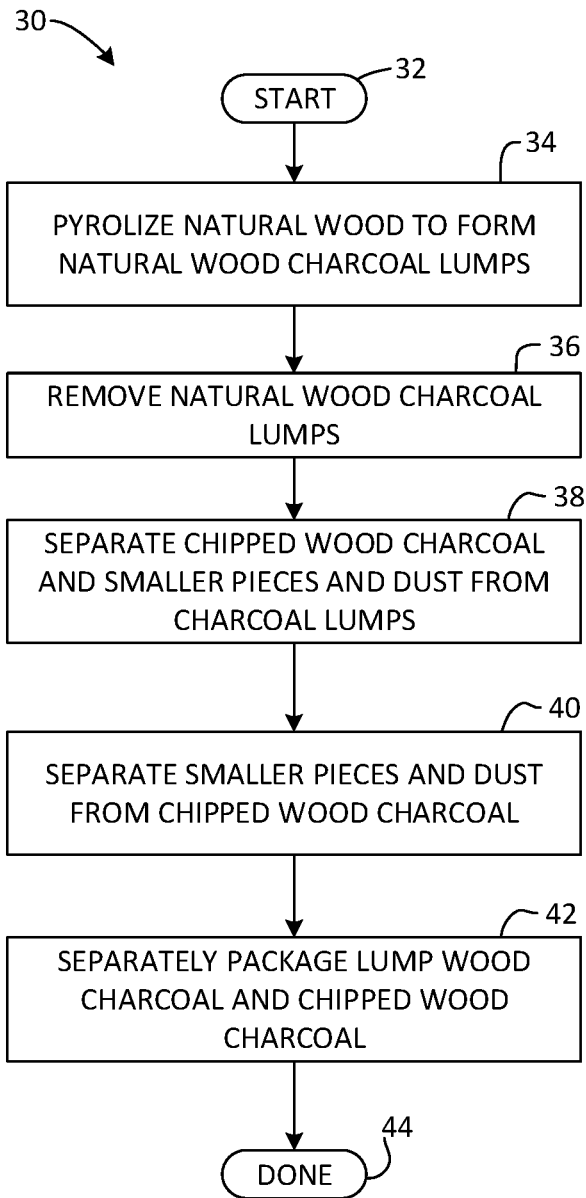
FIG. 2 shows a flow chart diagram of an exemplary method for isolating high-carbon chipped wood charcoal.

FIG. 2 shows a flowchart 30 illustrating by way of example a method for producing the novel chipped wood charcoal fuel envisioned. The method starts at start block 32 and flows to operation 34 wherein natural wood is pyrolyzed in kilns to form natural wood charcoal lumps. These lumps are brittle and light-weight with outer-most portions being very brittle and very high in fixed carbon. As a result while removing wood charcoal lumps from the kiln in operation 36, smaller pieces, referred herein as "chipped wood charcoal," of these outer most portions of the charcoal lumps fall away. In operation 38, the chipped wood charcoal and smaller pieces and dust are separated from lump wood charcoal. In one embodiment, to separate the chips from lumps, the lumps and chips are passed over a first screen or sieve to selectively allow chipped wood charcoal, smaller pieces, and dust to fall through the sieve while retaining the larger charcoal lumps. In one embodiment, the first sieve is configured to remove pieces that are about three-eighths of an inch in their longest dimension or smaller. The larger lumps may then be packaged as standard solid lump wood charcoal as shown in operation 42.

In operation 40, the combined chipped wood charcoal and smaller pieces and dust are passed over a second screen or sieve. In one embodiment, the second sieve is configured to remove pieces smaller than about one quarter inch, as well as any charcoal dust. In this way, chipped wood charcoal sized from between about one-quarter inch to about three-eighths of an inch are isolated. This fuel is very high in fixed carbon as compared to standard lump wood charcoal and as a result as unique and superior cooking properties. The isolated chipped wood charcoal is then packaged separately from the lump wood charcoal as shown in operation 42, and may therefore be sold as a distinct product. Method 30 then ends as indicated by "done" block 44.

It should be understood that additional screening operations may be implemented to further size out different sized lumps of charcoal, or for other purposes. However, the method described herein requires at least a first sieve to isolate chipped charcoal pieces smaller than a first size, and a second sieve to isolate those pieces from dust and other pieces smaller than a second size, which is smaller than the first size. In this way pieces of relatively consistent desirable size may be obtained. While chipped wood charcoal pieces from between one-quarter and three-eighths inch is provided as an exemplary size, other sizes may be generated using differently-configured sieves in other embodiments. However, the size from one-quarter to three-eighths inch has been determined optimal for passing through typical food supporting grill grates while still being supportable by a grid 14, when appropriately sized and configured.

Referring back to FIG. 1, grid 14 may be simply "dropped" into existing, ordinary, grilling devices, without modification thereof, directly onto a briquette support grate, or radiant bars, heat spreaders, lava rocks, etc., of consumer or commercial natural gas or propane grills. Use of gas grills as the advantage that chipped wood charcoal fuel 20 may be ignited simply by running the gas burners a short time, until ignited, or left on, if desired, for example, to provide extra heat. Once ignited, the gas burners may be shut off. In a charcoal grill, such as a Weber® kettle-style charcoal grill, the chipped charcoal may be ignited in various ways, from the use of existing electric ignition devices, to using a butane torch, or even lighter fluid or lighter blocks used for starting wood fires. Chipped wood charcoal will ignite easily and burn hotter, and leave very little ash in comparison to standard briquettes and other wood fuels. Once fully ignited, cooking may begin immediately, since chipped wood charcoal has very few volatiles (unlike briquettes) and will only enhance the flavor of grilled meats and vegetables.

Figure 3:
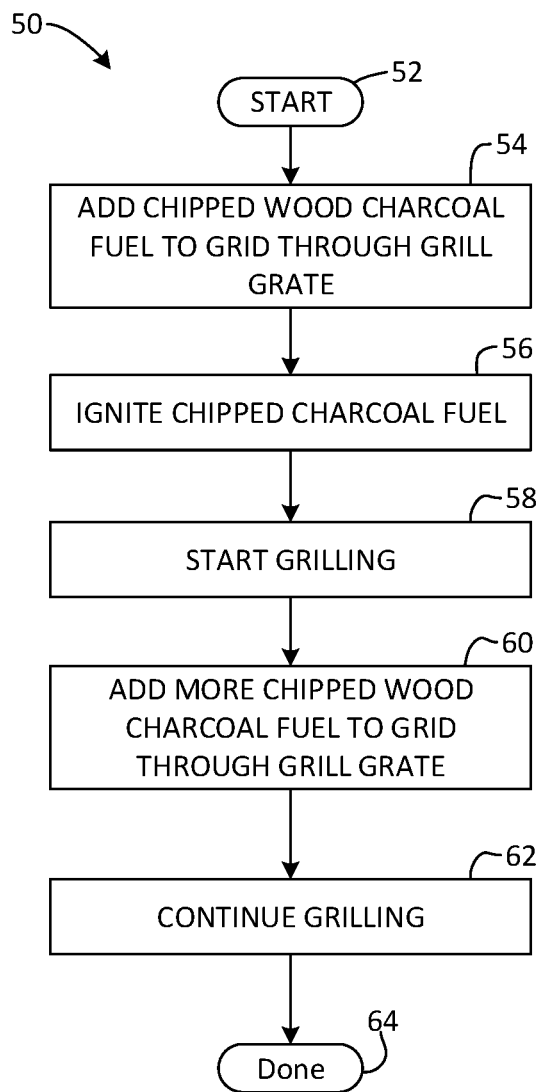
FIG. 3 shows a flow chart diagram of an exemplary method for grilling food.

FIG. 3 shows flowchart 50 illustrating by way of example a method of grilling food with grid 14 shown in FIG. 1. This method will be described below with reference to FIG. 1. An initial step, not shown, may include adding grid 14 to an existing consumer or commercial grilling apparatus, such as a typical solid fuel or gas or propane grill. The grid may be added simply by lifting food supporting grill grate 12 and dropping grid 14 directly onto solid fuel support, or in a gas or propane grill, heat spreaders, bars, lava rocks, etc., as previously described, and then replacing food supporting grill grate 12. Once the grilling apparatus is so configured, method 50 begins as indicated by start block 52 which flows to operation 54, wherein chipped wood charcoal is to grid 14 through food supporting grill grate 12. As previously described, the chipped wood charcoal fuel is sized to easily fall through food supporting grill grate while grid 14 is configured for supporting chipped wood charcoal fuel, allowing only minimal fall-through thereof, and providing sufficient airflow to maintain optimum burning and consequential heat generation. Since the fuel is a natural wood product, any dust or small pieces adhering to the food supporting grill grate pose no health risk, and at any rate is likely to burn away during the cooking process.

After the fuel is added to grid 14, it may be ignited by the grilling apparatus's existing gas or propane burners. The gas or propane is used to ignite the chipped wood charcoal fuel, and then optionally turned off during cooking. Alternatively, a butane torchor electric ignition device may be used to ignite the chipped wood charcoal fuel. Once ignited, method 50 flows to operation 58 where food may immediately be added to the food supporting grill grate 12 for commencement of grilling. If grilling requires continuous heat over a long period of time such that additional fuel is required to be added to grid 14, additional fuel may be added as shown by operation 60, without lifting the food supporting grill grate 12 and therefore without interrupting the grilling of food. Then, in operation 62, the food is continued to be grilled after the fuel is added. The method then ends as indicated by "done" block 64.

As explained above, the present invention has significant advantages over prior food grilling systems. For example, due to high heat output, it provides for decreased food grilling time. Secondly, it provides for instant, non-stop refueling. Third, the use of natural chipped wood charcoal adds natural wood grilled food flavors. Fourth, superior dry heat sears food for better internal moisture retention in any kind of meat and many vegetables. Fifth, because the chipped wood charcoal comprises smaller pieces of solid fuel than traditional fuels, it actually packs denser and therefore less is required to grill foods, and for the same weight in fuel, less storage space than traditional solid wood fuels. These and other advantages would be recognized by experts and grilling enthusiasts.

Described hereinabove are a method for isolating a unique and desirable material useful as fuel for grilling food, a grid for supporting said fuel within existing traditional solid fuel and gas or propane grilling apparatuses, and a method for using such modified grilling apparatuses for cooking food and for adding fuel thereof while cooking, in an uninterrupted way.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

What is claimed is:

1. A method for isolating high fixed-carbon chipped wood charcoal fuel suitable for food grilling, the method comprising:
    removing pyrolyzed wood charcoal from a kiln, the pyrolyzed wood charcoal comprising lumps, chips, smaller pieces, and dust particles, the chips, the smaller pieces, and the dust particles having naturally detached from exterior surfaces of the lumps during pyrolysis of the pyrolyzed wood charcoal and during removal of the lumps from the kiln;
    passing the pyrolyzed wood charcoal over a first sieve that is configured to separate the lumps from the chips, the smaller pieces, and the dust particles, the first sieve comprising first openings configured to:
       retain the lumps, the lumps being about three-eighths inches and larger in their longest dimension; and
       remove the chips, the smaller pieces, and the dust particles;
    passing the chips, the smaller pieces, and the dust particles removed by the first sieve over a second sieve that is configured to separate the chips from the smaller pieces and the dust particles, the second sieve comprising second openings that are smaller than the first openings of the first sieve, the second openings of the second sieve configured to:
       retain the chips; and
       remove the smaller pieces and the dust particles, wherein the smaller pieces and the dust particles are smaller than a particular size less than three-eighths inches in their longest dimension; and
    wherein, after passing the pyrolyzed wood charcoal over the first sieve and the second sieve, the chips are substantially isolated from the lumps, the smaller pieces, and the dust particles, and wherein the isolated chips have a higher concentration of fixed carbon than the lumps from which they are separated therefrom.

2. The method of claim 1, wherein the second sieve is configured to separate the chips from the dust particles and the smaller pieces so that a majority of the isolated chips are at least about one quarter inch along their longest dimension.

3. The method of claim 2, wherein substantially all of the isolated chips are between about one quarter inch along their longest dimension and about three-eighths of an inch in their longest dimension.

4. The method of claim 1, further comprising packaging the isolated chips separately from the lumps, the smaller pieces, and the dust particles.

5. The method of claim 1, wherein the isolated chips are a size that is equal to or greater than the particular size.

6. The method of claim 1, wherein the isolated chips are the high fixed-carbon chipped wood charcoal fuel.

7. The method of claim 1, further comprising:
    after removing the chips, the smaller pieces, and the dust particles using the first sieve, combining the removed chips, smaller pieces, and dust particles into the second sieve.

* * * * *